(12) United States Patent  
Gershteyn et al.

(10) Patent No.: US 12,181,334 B2  
(45) Date of Patent: Dec. 31, 2024

(54) NEONATAL SCALE PLATFORM HAVING FLEXIBLE CABLE FOR MAINTAINING SCALE CALIBRATION

(71) Applicant: Drägerwerk AG & Co. KGaA, Lübeck (DE)

(72) Inventors: Jacob Gershteyn, Newtown, PA (US); Gregory Kalamon, Pottstown, PA (US)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 607 days.

(21) Appl. No.: 17/478,616

(22) Filed: Sep. 17, 2021

(65) Prior Publication Data

US 2022/0205833 A1 Jun. 30, 2022

Related U.S. Application Data

(60) Provisional application No. 63/132,151, filed on Dec. 30, 2020.

(51) Int. Cl.
| | |
|---|---|
| *G01G 23/01* | (2006.01) |
| *A61G 11/00* | (2006.01) |
| *G01G 19/44* | (2006.01) |
| *G01G 21/22* | (2006.01) |
| *G01G 21/28* | (2006.01) |

(52) U.S. Cl.
CPC ........... *G01G 23/01* (2013.01); *A61G 11/008* (2013.01); *G01G 19/445* (2013.01); *G01G 21/22* (2013.01); *A61G 2203/44* (2013.01)

(58) Field of Classification Search
CPC .. A61G 11/008; A61G 2203/44; G01G 23/01; G01G 21/22; G01G 21/28; G01G 19/445; G01G 19/52

See application file for complete search history.

(56) References Cited

U.S. PATENT DOCUMENTS

| | | | | |
|---|---|---|---|---|
| 5,512,713 | A * | 4/1996 | Naito .................... | G01G 3/1412 177/229 |
| 5,623,128 | A * | 4/1997 | Grimm .................... | G01G 3/18 177/229 |
| 6,180,893 | B1 * | 1/2001 | Salgo ................... | G01G 19/445 177/144 |

(Continued)

*Primary Examiner* — Randy W Gibson  
(74) *Attorney, Agent, or Firm* — NOLTE LACKENBACH SIEGEL (57) ABSTRACT

An apparatus and method of calibrating the apparatus are disclosed. The apparatus may include a scale platform, a warming therapy device comprising a bassinet and at least one electrical device, the warming therapy device being disposed on the scale platform, the scale platform disposed between the warming therapy device and the base; and a conductor assembly adapted to (a) supply electrical power between a power supply and at least some of the at least one electrical device, and (b) enable the transmission of electrical signals from the at least one electrical device to the computer system, the conductor assembly comprising a scale platform cable assembly comprising a plurality of conductors, the scale platform cable assembly having a first connector end and a second connector end, the first connector end being rigidly affixed to the load cell carrier and the second connector end being rigidly affixed to the scale platform cover.

26 Claims, 6 Drawing Sheets

(56) References Cited

U.S. PATENT DOCUMENTS

| | | | | |
|---|---|---|---|---|
| 6,761,683 | B2* | 7/2004 | Gryn | A61G 11/00 |
| | | | | 5/655 |
| 7,002,084 | B2* | 2/2006 | Cox | H05K 5/06 |
| | | | | 174/50.5 |
| 7,397,003 | B2* | 7/2008 | Cox | H05K 5/06 |
| | | | | 174/50.53 |
| 8,785,793 | B2* | 7/2014 | Cox | H05K 5/06 |
| | | | | 361/752 |
| 9,572,740 | B2* | 2/2017 | Bodlaender | A61G 11/00 |
| 10,572,740 | B2* | 2/2020 | Ribeiro | G06V 20/40 |
| 10,634,549 | B2* | 4/2020 | Charles | A61G 7/0506 |
| 2002/0029911 | A1* | 3/2002 | Richards | G01G 23/002 |
| | | | | 177/144 |
| 2011/0119028 | A1* | 5/2011 | Bishop | G01G 23/015 |
| | | | | 73/1.13 |

* cited by examiner

NEONATAL SCALE PLATFORM HAVING FLEXIBLE CABLE FOR MAINTAINING SCALE CALIBRATION

CROSS REFERENCE TO RELATED APPLICATION

The present application claims priority under 35 U.S.C. § 119(e) to U.S. Prov. App. Ser. No. 63/132,151, entitled NEONATAL SCALE PLATFORM HAVING FLEXIBLE CABLE FOR MAINTAINING SCALE CALIBRATION, filed Dec. 30, 2020, the entire contents of which are hereby incorporated by reference herein.

FIELD OF THE DISCLOSURE

The present disclosure relates generally to a neonatal scale platform. More particularly, the present disclosure relates to a neonatal scale platform that may be used to weigh a bassinet while the bassinet is tilted at various angles without affecting the factory calibration of the neonatal scale platform.

BACKGROUND

Infant care units, such as warming therapy devices (e.g., incubators, warmers, etc.) that include various systems for controlling the temperature and humidity to facilitate the development of a premature infant, are known. These devices may include a bassinet that may have an infant support surface for supporting an infant, as well as means of protecting the infant, such as a hood or canopy which covers the infant support surface. The bassinet may also be capable of tilting to various angles for therapeutic reasons for the infant placed within the bassinet.

In some units, the bassinet is positioned on a scale platform so that the weight of an infant placed in the bassinet can be measured. Existing infant care units are generally capable of being calibrated to provide an accurate weight measurement with the bassinet at a single tilt position (usually the horizontal position). This is not ideal because it requires additional time for medical personnel to move the bassinet into the calibrated position and it introduces the possibility of a less accurate measurement if the bassinet is in the incorrect tilt position when weight is measured. In addition, particular infants may be more comfortable and still in a tilt position other than the calibration position.

Accordingly, there is a need for a scale platform for a warming therapy device that can maintain factory weight calibration with the bassinet in a wider variety of tilt positions.

SUMMARY

In one embodiment of the present disclosure, an apparatus may include a computer system comprising a processor or controller, a user interface, and memory; a base; a scale platform disposed on the base, the scale platform comprising: a scale platform load cell carrier; a scale platform cover; and a plurality of load cells positioned between the scale platform load cell carrier and the scale platform cover; a warming therapy device comprising a bassinet and at least one electrical device, the at least one electrical device selected from the group of: at least one physiological sensor, a temperature sensor, a heater, a tilt position sensor, and a tilt mechanism, the warming therapy device being disposed on the scale platform, the scale platform disposed between the warming therapy device and the base; and a conductor assembly adapted to (a) supply electrical power between a power supply and at least some of the at least one electrical device, and (b) enable the transmission of electrical signals from the at least one electrical device to the computer system, the conductor assembly comprising a scale platform cable assembly comprising a plurality of conductors, the scale platform cable assembly having a first connector end and a second connector end, the first connector end being rigidly affixed to the load cell carrier and the second connector end being rigidly affixed to the scale platform cover.

In another embodiment of the present disclosure, an apparatus may include a computer system comprising a processor or controller, a user interface, and memory; a base; and a scale platform disposed on the base, the scale platform comprising: a scale platform load cell carrier; a scale platform cover; a plurality of load cells positioned between the scale platform load cell carrier and the scale platform cover; and a scale platform cable assembly extending between the scale platform load cell carrier and the scale platform cover, the scale platform cable assembly comprising: a first connector end rigidly affixed to the scale platform load cell carrier; a second connector end rigidly affixed to the scale platform cover; and a flexible ribbon cable extending between the first connector end and the second connector end.

In a still further embodiment of the present disclosure, a warming therapy device may include a base flange; a scale platform disposed on the base flange; and a bassinet disposed on the scale platform, wherein the bassinet is transitionable among a plurality of angled positions and wherein the scale platform provides a factory calibrated weight measurement of the bassinet and an infant placed therein at each of the plurality of angled positions of the bassinet.

In a further embodiment of the present disclosure, A scale platform for a warming therapy device may include a scale platform load cell carrier; a scale platform cover that fits over the scale platform load cell carrier; and a scale platform cable assembly extending between the scale platform load cell carrier and the scale platform cover, wherein the scale platform cable assembly provides a downward force on the scale platform cover that is constant regardless of the position of the scale platform cover with respect to the scale platform load cell carrier.

In yet a further embodiment of the present disclosure, a method of calibrating a scale platform of a warming therapy device may include orienting a bassinet of the warming therapy device to a plurality of angled positions; placing a test weight in the bassinet at each of the multiple angled positions; measuring the test weight at each of the multiple angled positions; and determining whether a measured weight equals the test weight at each of the plurality of angled positions.

These and other aspects of the present disclosure are more fully described herein with reference to the accompanying figures.

BRIEF DESCRIPTION OF THE DRAWINGS

For a more complete understanding of the present invention, reference is made to the following detailed description of embodiments considered in conjunction with the accompanying drawings, in which.

DETAILED DESCRIPTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment, but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Figure 1:
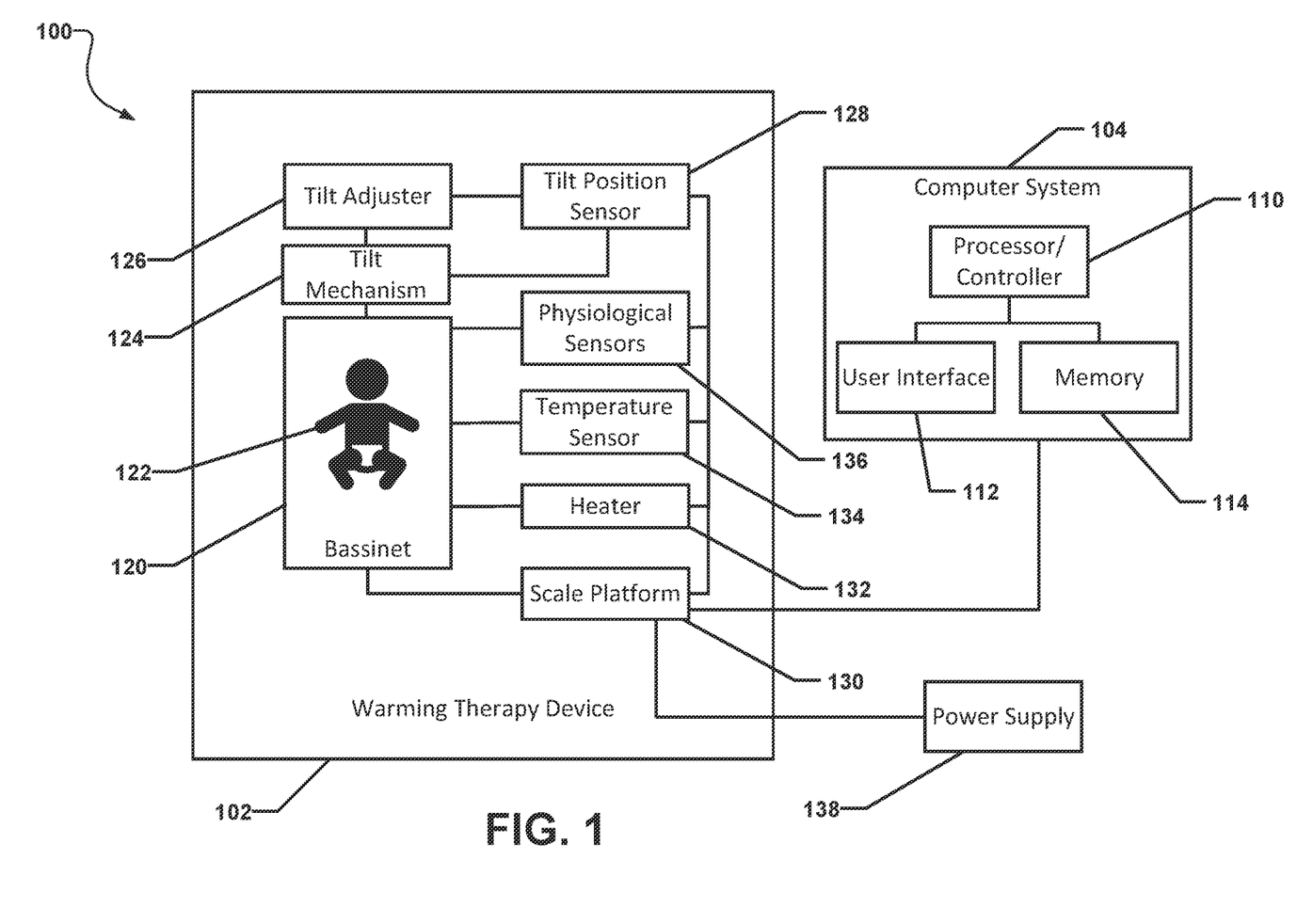
FIG. 1 is a block diagram of a system for operating a warming therapy device according to an embodiment of the present disclosure.

Referring now to FIG. 1, a system for operating a warming therapy device is depicted and is generally designated 100. As shown, the system 100 may include a warming therapy device 102 electrically coupled to a computer system 104. The computer system 104 may include a processor/controller 110 having a user interface 112 and a memory 114 connected thereto. The user interface 112 may include a keyboard, a mouse, a display, a touch display, a stylus, a printer, or a combination thereof. The memory 114 may include a volatile memory, a non-volatile memory, or a combination there.

For example, the volatile memory may be random access memory, such as a static random access memory (SRAM) or a dynamic random access memory (DRAM). Examples, of non-volatile memory may include a read only memory (ROM), such as an erasable programmable read-only memory (EPROM), an electrically erasable programmable read-only memory (EEPROM), a flash memory, a solid state drive (SSD), or a hard disk drive (HDD).

Still referring to FIG. 1, the warming therapy device 102 may include a bassinet 120 in which an infant 122 may be placed. The warming therapy device 102 may also include a tilt mechanism 124 on which the bassinet 120 may be placed. Further, the warming therapy device 102 may include a tilt adjuster 126 coupled to the tilt mechanism 124. The tilt adjuster 126 may be used to operate the tilt mechanism 124 in order to tilt the bassinet 120 disposed thereon to various angles. As shown, the warming therapy device 102 may include a tilt position sensor 128 electrically coupled to the tilt adjuster 126 and/or the tilt mechanism 124.

The tilt position sensor 128 may be electrically coupled to the computer system 104. Specifically, the tilt position sensor 128 may be electrically coupled to the processor/controller 110 within the computer system 104. It is to be understood that the tilt position sensor 128 may detect the angle at which the bassinet 120 is tilted during operation of the warming therapy device 102. Further, it is to be understood that a user may input a specific bassinet angle via the user interface 112 at the computer system 104 and the computer system 104 may send a signal to the tilt adjuster 126 in order to operate the tilt mechanism 124 until the selected tilt angle is sensed or detected by the tilt position sensor 128. When the selected tilt angle is detected by the tilt position sensor 128, the tilt operation may cease and the bassinet 120 may remain at the selected tilt angle.

FIG. 1 further shows that the warming therapy device 102 may include a scale platform 130 on which the bassinet 120 may be disposed. The scale platform 130 may be used to monitor the weight of the infant 122 placed in the bassinet 120. The scale platform 130 may be electrically coupled to the computer system 104 such that the processor/controller 110 therein may transmit a signal representing the weight measured by the scale platform 130 to the computer system 104. The warming therapy device 102 may further include a heater 132 and a temperature sensor 134 incorporated into the bassinet 120. For example, the heater 132 may include a heater plate (not shown) that may be incorporated into the base or bottom of the bassinet 120.

As illustrated, the heater 132 and the temperature sensor 134 may be electrically coupled to the computer system 104. A user may input a target temperature to the computer system 104 via the user interface 112 and the computer system 104 may transmit a control signal representing the target temperature to the heater 132. The control signal may energize, or otherwise power on, the heater 132. The temperature sensor 134 may monitor the temperature within the bassinet 120 and when the target temperature is detected, the temperature sensor 134 may send a signal to the computer system 104, which, in turn, may send a signal to de-energize the heater 132. FIG. 1 also shows that the system 100 may further include one or more physiological sensors 136 that may be used to monitor various vital signs of the infant 122 placed in the bassinet 120.

As further shown in FIG. 1, the system 100 may include a power supply 138. Moreover, the scale platform 130 may include connector assembly (not shown in FIG. 1) that may be adapted to supply electrical power between the power supply 138 and at least some of the electrical devices, e.g., the physiological sensor(s) 136, the temperature sensor 134, the heater 132, the tilt position sensor 128, the tilt adjuster 126, and the tilt mechanism 124. A connector assembly (not shown in FIG. 1) may also be adapted to enable transmission of electrical signals from at least one of the electrical devices (e.g., the physiological sensor(s) 136, the temperature sensor 134, the heater 132, the tilt position sensor 128, the tilt adjuster 126, and/or the tilt mechanism 124) to the computer system 104 via the scale platform 130. In other words, the physiological sensor(s) 136, the temperature sensor 134, the heater 132, the tilt position sensor 128, the tilt adjuster 126, and the tilt mechanism 124 may be connected to the computer system 104 and the power supply 138 through the scale platform 130 via the connector assembly (not shown in FIG. 1) within the scale platform 130. An example of a connector assembly may include a scale platform cable assembly 430, as shown in FIGS. 4-9.

Figure 2:
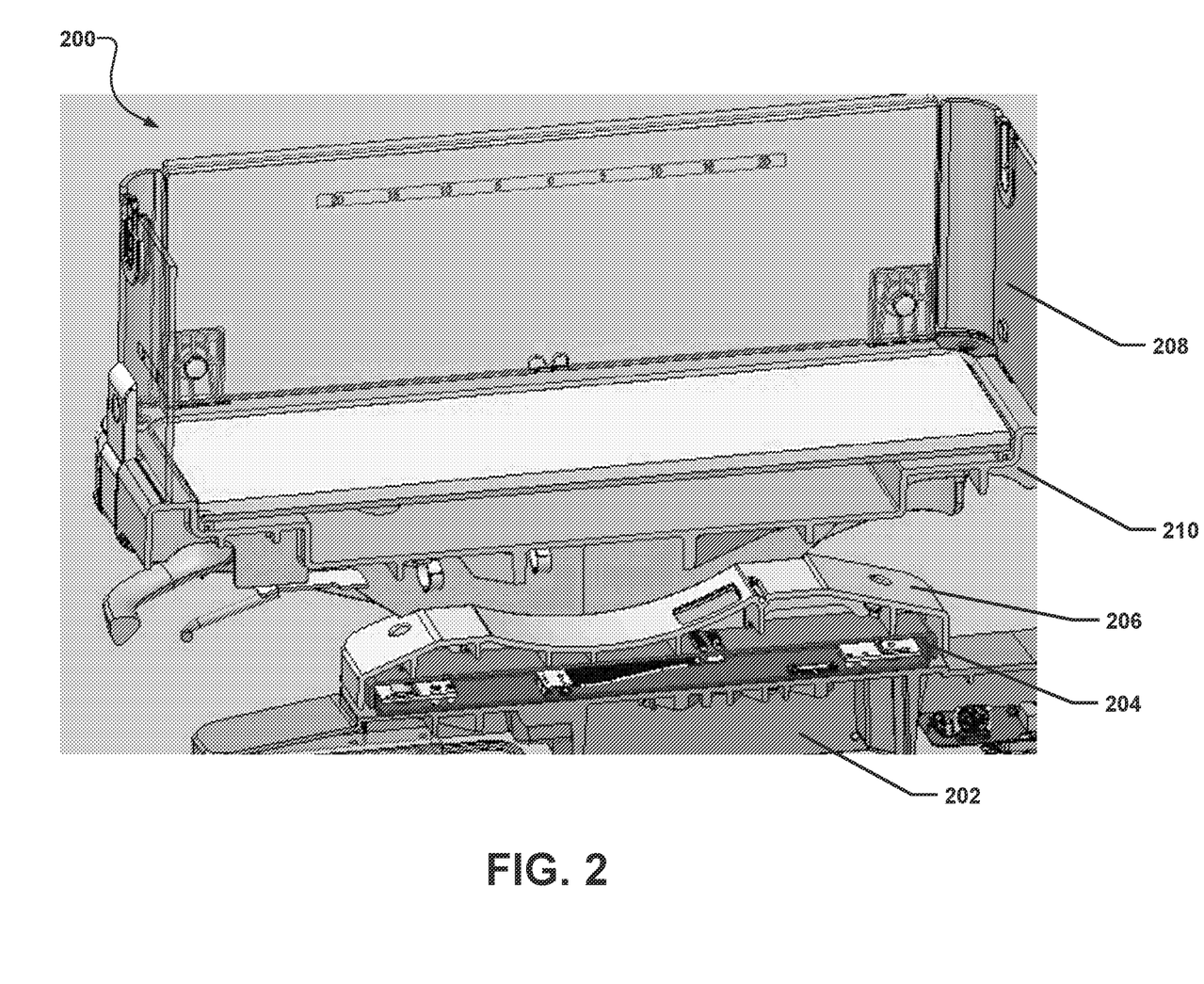
FIG. 2 is a cross-sectional view of a warming therapy device according to an embodiment of the present disclosure.

FIG. 2 includes a cross-section of a warming therapy device, generally designated 200. As shown, the warming therapy device 200 may include a base flange 202 that may be connected to, or otherwise disposed on, an upper end of a vertical housing assembly (VHA) stand shroud (not shown). A scale platform 204, may be installed on the base flange 202 of the warming therapy device 200. The scale platform 204 is described in greater detail below. The warming therapy device 200 may also include a tilt support 206 disposed on the scale platform 204. An example of a warming therapy device may be found in U.S. Pat. No. 8,706,527, issued on Apr. 22, 2014 and entitled "Method and apparatus for controlling a warming therapy device," the disclosure of which is incorporated in its entirety herein by reference.

A bassinet 208 may be disposed on the tilt support 206. As illustrated, the bassinet 208 may include a tilt bottom 210 that fits into the tilt support 206. It is to be understood that the tilt bottom 210 of the bassinet 208 cooperates with the tilt support 206 to allow the bassinet 208 to tilt with respect to the base flange 202 of the warming therapy device 200. Specifically, the bassinet 208 may be tilted to multiple angled positions with an infant therein for therapeutic reasons. The design of the scale platform 204 allows the scale platform 204 to remain accurate and maintain its factory calibration regardless of the angular position of the bassinet 208. Specifically, the bassinet 208 may be moved to multiple angled positions and the scale platform 204 may be provided with factory calibrated weight measurements of the bassinet 208 and an infant placed therein at the multiple angled positions of the bassinet 208.

Figure 3:
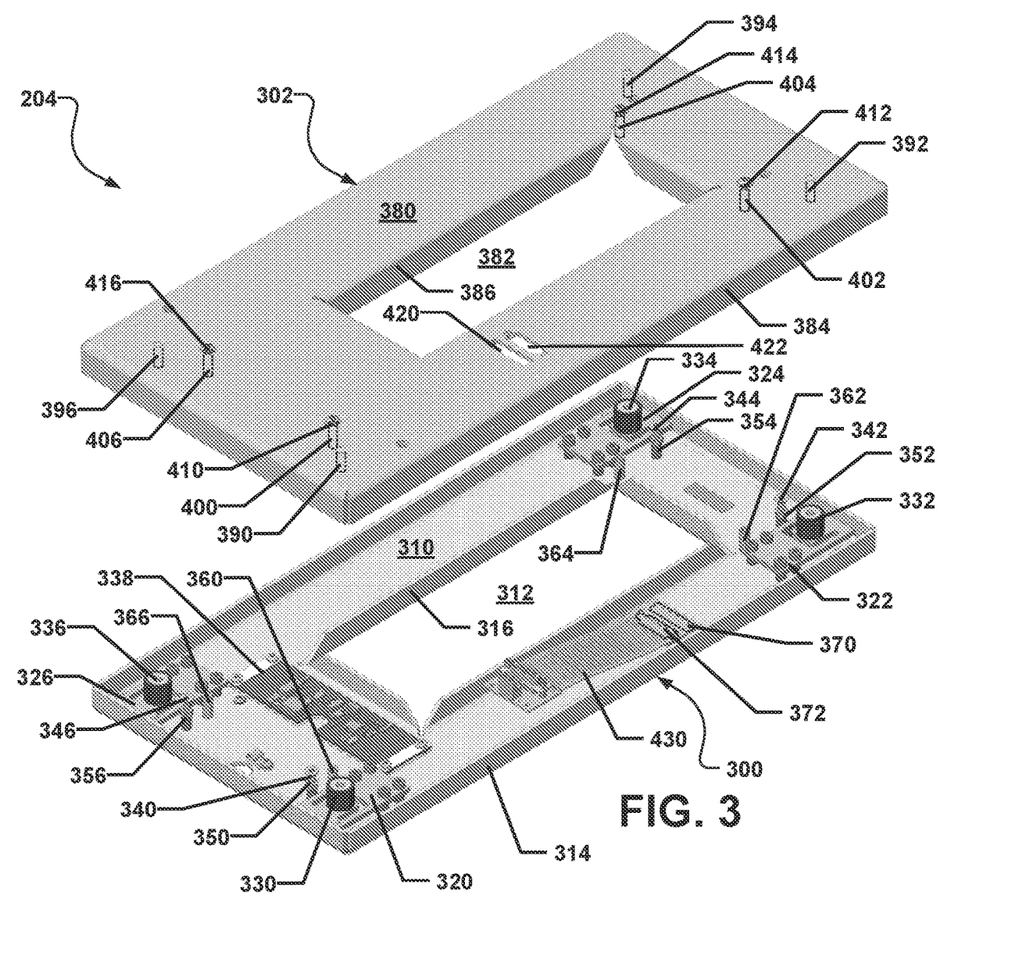
FIG. 3 is an exploded view of a scale platform according to an embodiment of the present disclosure.
Figure 4:
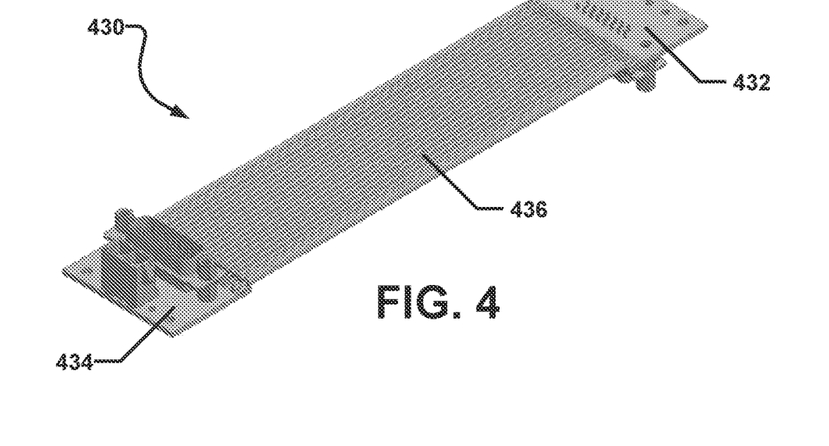
FIG. 4 is a perspective view of a scale platform cable assembly according to an embodiment of the present disclosure.
Figure 5:
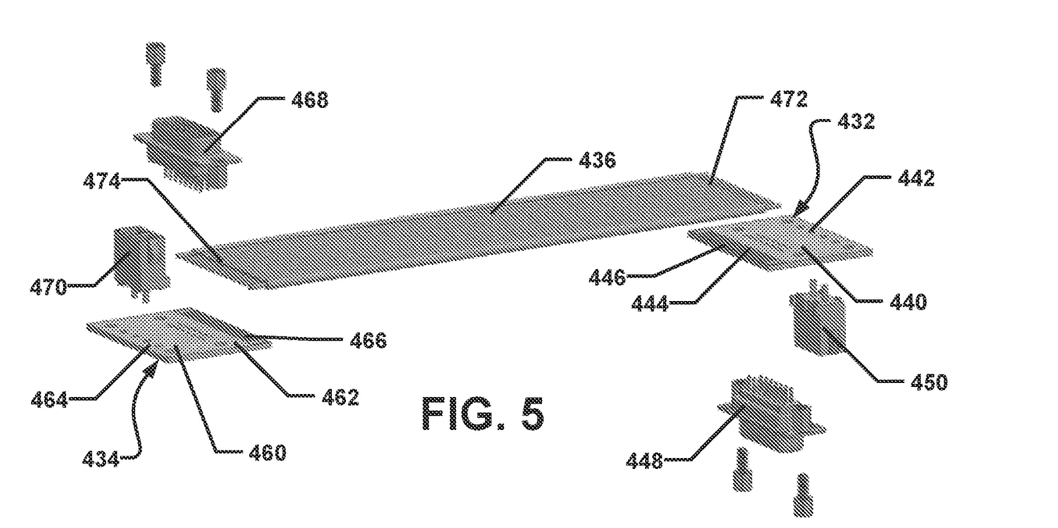
FIG. 5 is an exploded view of a scale platform cable assembly according to an embodiment of the present disclosure.
Figure 6:
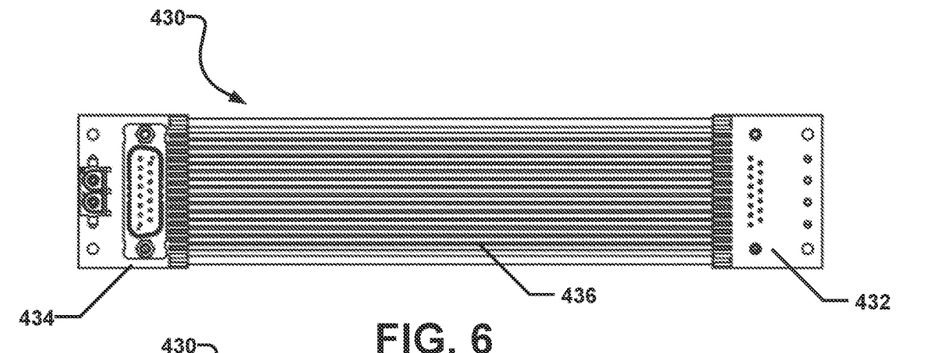
FIG. 6 is a top plan view of a scale platform cable assembly according to an embodiment of the present disclosure.
Figure 7:
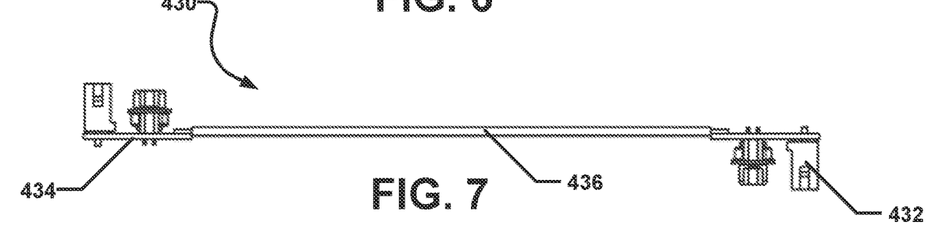
FIG. 7 is a side plan view of a scale platform cable assembly according to an embodiment of the present disclosure.
Figure 8:
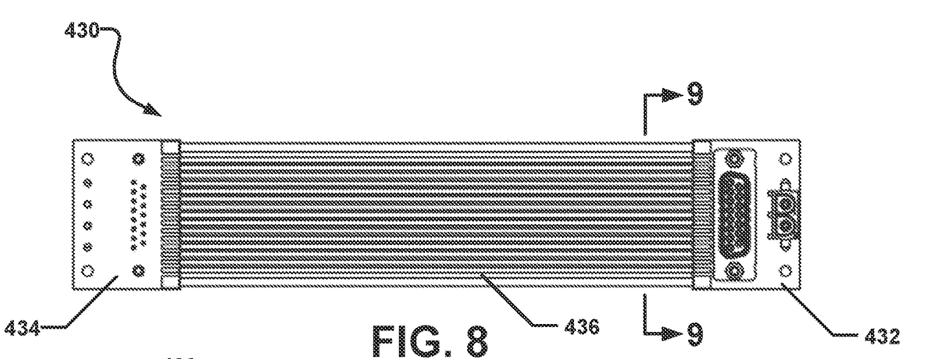
FIG. 8 is a bottom plan view of a scale platform cable assembly according to an embodiment of the present disclosure.

Referring now to FIG. 3, details concerning the scale platform 204 are illustrated. As shown, the scale platform 204 may include a scale platform load cell carrier 300 and a scale platform cover 302. Referring briefly back to FIG. 2, the scale platform load cell carrier 300 may be connected to, or otherwise affixed to, the base flange 202 of the warming therapy device 200 by a plurality of fasteners (not shown). Further, the scale platform cover 302 may be connected to, or otherwise affixed to, the tilt support 206 by a plurality of fasteners (not shown).

Referring again to FIG. 3, the scale platform load cell carrier 300 may include a generally flat, rectangular lower plate 310 formed with a central opening 312. As illustrated, the central opening 312 may be generally rectangular. The scale platform load cell carrier 300 may include a generally rectangular outer wall 314 that may extend in a generally upward direction from the lower plate 310 at the outer periphery of the lower plate 310 of the scale platform load cell carrier 300 and the outer wall 314 may be substantially perpendicular to the lower plate 310. The scale platform load cell carrier 300 may also include a generally rectangular inner wall 316 that may extend in a generally upward direction from the lower plate 310 around the central opening 312 formed in the lower plate 310 of the scale platform load cell carrier 300 and the inner wall 316 may be substantially perpendicular to the lower plate 310.

FIG. 3 further indicates that the scale platform load cell carrier 300 of the scale platform 204 may also include a first load cell 320, a second load cell 322, a third load cell 324, and a fourth load carrier assembly 326. Each of the load cells 320, 322, 324, 326 may be affixed to the lower plate 310 of the scale platform load cell carrier 300 near a respective corner of the scale platform load cell carrier 300. Moreover, each load cell 320, 322, 324, 326 may include a respective load mount 330, 332, 334, 336 that may be made from ethylene propylene diene monomer (EPDM) rubber. Each load cell 320, 322, 324, 326 may be connected to a central load cell printed circuit board (PCB) 338 that, in turn, may be connected to a computer system, e.g., the computer system 104 shown in FIG. 1.

The scale platform 204 may include a first compression overload screw 340, a second compression overload screw 342, a third compression overload screw 344, and a fourth compression overload screw 346. Each compression overload screw 340, 342, 344, 346 may be threadably engaged with a respective threaded overload screw receiving post 350, 352, 354, 356 disposed on the lower plate 310 of the scale platform load cell carrier 300 near a respective load cell 320, 322, 324, 326. Specifically, each compression overload screw 340, 342, 344, 346 and its respective threaded overload screw receiving post 350, 352, 354, 356 may be disposed on the lower plate 310 of the scale platform load cell carrier 300 immediately adjacent to and aligned with a load mount 330, 332, 334, 336 on a load cell 320, 322, 324, 326. Each compression overload screw 340, 342, 344, 346 and its respective threaded overload screw receiving post 350, 352, 354, 356 may extend generally upward from the lower plate 310 of the scale platform load cell carrier 300 and may be substantially perpendicular to the lower plate 310 of the scale platform load cell carrier 300.

Additionally, as shown in FIG. 3, the scale platform load cell carrier 300 of the scale platform 204 may include a first threaded lift off screw receiving post 360, a second threaded lift off screw receiving post 362, a third threaded lift off screw receiving post 364, and a fourth threaded lift off screw receiving post 366. Each of the threaded lift off screw receiving posts 360, 362, 364, 366 may be disposed on the lower plate 310 of the scale platform load cell carrier 300 near a respective load cell 320, 322, 324, 326 and near a respective compression overload screw 340, 342, 344, 346 and threaded overload screw receiving post 350, 352, 354, 356. Each of the threaded lift off screw receiving posts 360, 362, 364, 366 may extend in a generally upward direction from the lower plate 310 of the scale platform load cell carrier 300 and may be substantially perpendicular to the lower plate 310 of the scale platform load cell carrier. The lower plate 310 of the scale platform load cell carrier 300 may also include a lower power connector through hole 370 and a lower data connector through hole 372.

The scale platform cover 302 may include a generally flat, rectangular upper plate 380 formed with a central opening 382. As illustrated, the central opening 382 may be generally rectangular. The scale platform cover 302 may include a generally rectangular outer wall 384 that may extend in a generally upward direction from the upper plate 380 at the outer periphery of the upper plate 380 of the scale platform cover 302 and the outer wall 384 may be substantially perpendicular to the upper plate 380. The scale platform cover 302 may also include a generally rectangular inner wall 386 that may extend in a generally upward direction from the upper plate 380 around the central opening 382 formed in the upper plate 380 of the scale platform cover 302 and the inner wall 386 may be substantially perpendicular to the upper plate 380.

The scale platform 204 may include a first load cell post 390, a second load cell post 392, a third load cell post 394, and a fourth load cell post 396 that may extend in a generally downward direction from the upper plate 380 of the scale platform cover 302. Each load cell post 390, 392, 394, 396 may be substantially perpendicular to the upper plate 380 of the scale platform cover 302. Further, each load cell post 390, 392, 394, 396 may be engaged with a respective load cell 320, 322, 324, 326 on the scale platform load cell carrier 300 of the scale platform 204 when the scale platform cover 302 is placed on the scale platform load cell carrier 300. Specifically, each load cell post 390, 392, 394, 396 may be slidably engaged with a corresponding load mount 330, 332, 334, 336 of a load cell 320, 322, 324, 326. Each load cell post 390, 392, 394, 396 may transfer, or otherwise transmit, a portion of the load placed on the scale platform 204 to the load cells 320, 322, 324 326 via the load mounts 330, 332, 334, 336. The load cells 320, 322, 324, 326 may transmit electric signals that may be used to determine the weight of an object, e.g., an infant, placed in the bassinet 208 (FIG. 1).

As further illustrated in FIG. 3, the scale platform 204 may include a first lift off screw 400, a second lift off screw 402, a third lift off screw 404, and a fourth lift off screw 406 that may extend in a generally downward direction from the upper plate 380 of the scale platform cover 302. Specifically, each lift off screw 400, 402, 404, 406 may extend through a respective hole 410, 412, 414, 416 formed in the upper plate 380 of the scale platform cover 302. Each lift screw 400, 402, 404, 406 may be substantially perpendicular to the upper plate 380 of the scale platform cover 302. In addition, when the scale platform 204 is assembled, each lift screw 400, 402, 404, 406 may threadably engage a respective threaded lift off screw receiving post 360, 362, 364, 366 disposed on the lower plate 310 of the scale platform load cell carrier 300. As shown, the upper plate 312 of the scale platform cover 302 may also include an upper power connector through hole 420 and an upper data connector through hole 422.

The scale platform 204 may also include a connector assembly, which may include a scale assembly 430 as will be discussed in greater detail with respect to FIGS. 4-9. The control assembly may be adapted to supply electrical power between a power supply and at least some of the electrical devices illustrated in FIG. 1, e.g., the physiological sensor(s) 136, the temperature sensor 134, the heater 132, the tilt position sensor 128, the tilt adjuster 126, and the tilt mechanism 124. The connector assembly may also be adapted to enable transmission of electrical signals from at least one of the electrical devices to the computer system (FIG. 1).

In a particular aspect, the connector assembly may include the scale platform cable assembly 430 installed between the scale platform load cell carrier 300 and the scale platform cover 302. Specifically, the scale platform cable assembly 430 may extend between the scale platform load cell carrier 300 and the scale platform cover 302. As described in greater detail below, the scale platform cable assembly 430 may transmit power and one or more data signals.

Referring now to FIG. 4 through FIG. 9, details concerning the construction of the scale platform cable assembly 430 are illustrated. As shown, the scale platform cable assembly 430 may include a first connector end 432 and a second connector end 434. In a particular aspect, the connector ends 430, 432 may be rigid. Moreover, the second connector end 434 may be connected to the first connector end 432 via a flexible ribbon cable 436.

The first connector end 432 may include a first printed circuit board (PCB) 440 having a proximal end 442 and a distal end 444. The distal end 444 of the first PCB 440 may include a plurality of terminals 446 to which the flexible ribbon cable 436 may be soldered or otherwise connected. The first connector end 432 may also include first data connector 448, e.g., a female receptacle connector that may extend from the first PCB 440 substantially perpendicular to the first PCB 440 in a generally downward direction. In a particular aspect, the first data connector 448 may be a 15 pin d-sub receptacle, female receptacle connector and each pin receptacle may be electrically connected to a respective one of the plurality of terminals 446 on the distal end 444 of the first PCB 440.

The first connector end 432 may include a first power connector 450 that may extend from the first PCB 440 in a substantially perpendicular direction with respect to the first PCB 440 in a generally downward direction. In a particular aspect, the first power connector 450 may be a connector header through hole two position connector. The first power connector 450 may also be connected to two of the plurality of terminals 446 on the distal end 444 of the first PCB 440.

As illustrated, the second connector end 434 may include a second PCB 460 having a proximal end 462 and a distal end 464. The proximal end 462 of the second PCB 460 may include a plurality of terminals 466 to which the flexible ribbon cable 436 may be soldered or otherwise connected. The second connector end 434 may also include a second data connector 468, e.g., a male plug connector that may extend from the second PCB 460 substantially perpendicular to the second PCB 460 in a generally downward direction. In a particular aspect, the second data connector 468 may be a 15 pin d-sub plug, male pin connector and each male pin connector may be electrically connected to a respective one of the plurality of terminals 466 on the proximal end 442 of the second PCB 460.

As shown, the second connector end 434 may include a second power connector 470 that may extend from the second PCB 460 substantially perpendicular to the second PCB 460 in a generally upward direction. In a particular aspect, the second power connector 470 may be a connector header through hole two position connector. The second power connector 470 may also be connected to two of the plurality of terminals 466 on the proximal end 462 of the second PCB 460.

As shown in FIGS. 4 through 9, the flexible ribbon cable 436 may include a proximal end 472 and a distal end 474. The proximal end 472 of the flexible ribbon cable 436 may be soldered, or otherwise connected, to the terminals 446 on the distal end 444 of the first PCB 440 of the first connector end 432. Moreover, the distal end 474 of the flexible ribbon cable 436 may be soldered, or otherwise connected, to the terminals 466 on the proximal end 462 of the second PCB 460 of the second connector end 434.

Figure 9:
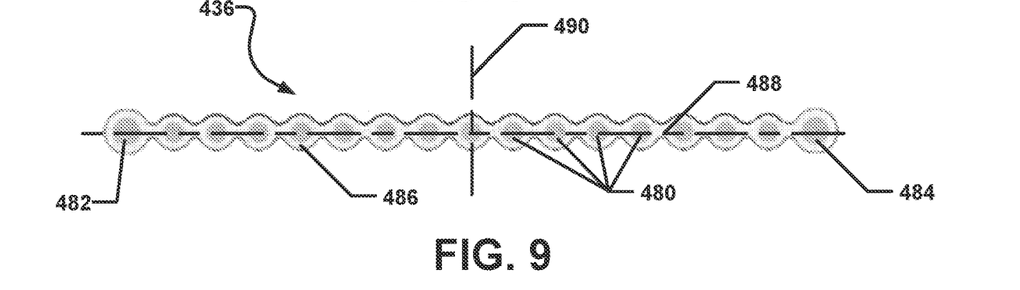
FIG. 9 is a cross-section view of a flexible ribbon cable according to an embodiment taken along line 9-9 in FIG. 8.

Referring now to FIG. 9, an end of the flexible ribbon cable 436 is depicted and indicates that the flexible ribbon cable 436 may include a plurality of conductors. Specifically, the flexible ribbon cable 436 may include a plurality of internal conductors 480 between, or flanked by, a first external conductor 482 and a second external conductor 484. In a particular aspect, the internal conductors 480 may transmit data signals along the length of the flexible ribbon cable 436. Moreover, the external conductors 482, 484 may transmit power along the length of the flexible ribbon cable 436.

As shown, the flexible ribbon cable 436 may include a plurality (e.g., fifteen) of internal conductors 480. However, the flexible ribbon cable 436 may include at least three internal conductors 480, such, at least four internal conductors, at least five internal conductors 480, at least six internal conductors 480, at least seven internal conductors 480, at least eight internal conductors 480, at least nine internal conductors 480, at least ten internal conductors 480, at least eleven internal conductors 480, at least twelve internal conductors 480, at least thirteen internal conductors 480, at least fourteen internal conductors 480, or at least fifteen internal conductors 480. In another aspect, the flexible ribbon cable 436 may include no more than twenty internal conductors 480, such as no more than nineteen internal conductors 480, no more than eighteen internal conductors 480, no more than seventeen internal conductors 480, or no more than sixteen internal conductors 480. It is to be understood that the number of internal conductors 480 may be in a range between, and including, any of the minimum and maximum number of internal conductors 480 described above.

Further, the internal conductors 480 and the external conductors 482, 484 may be completely encapsulated in a flexible insulating jacket 486 along the entire length of the flexible ribbon cable 436 except for the ends, which are soldered to the terminals 446, 466 on the PCBs 440, 460. In a particular aspect, the flexible insulating material may be a flexible polymer material. The flexible polymer material may include a flexible rubber material. Further, the flexible rubber material may include a silicone rubber material. The flexible insulating material may be used within a temperature range between and including −65° C. and 260° C. Moreover, the flexible rubber material may have a Shore A Durometer of 65.

Each conductor 480, 482, 484 may be completely encapsulated by the flexible insulating jacket 486 such that each conductor 480, 482, 484 may be separated from the other conductors 480, 482, 484. Moreover, each conductor 480, 482, 484 may be aligned with each other so that a cross-section taken at any location along the length of the flexible ribbon cable 436 will show that the conductors 480, 482, 484 are aligned along a transverse linear axis 488 perpendicular to a central axis 490. Further, the flexible ribbon cable 436 is substantially symmetric across the central axis 490. In other words, the same number of conductors 480, 482, 484 may be on each side of the central axis 490. Further, the same size conductors 480, 482, 484 may be on each side of the central axis 490. For example, as shown, the flexible ribbon cable 436 may include 8.5 conductors on each side of the central axis 490, i.e., 7.5 of the internal conductors 480 and 1 of the external conductors 482, 484. With the spacing and symmetry of the conductors 480, 482, 484 within the flexible ribbon cable 436 any loads present during flexing of the flexible ribbon cable 436 are evenly distributed along the flexible ribbon cable 436.

With respect to the conductor size, the size of each of the internal conductors 480 may be at least 30 American Wire Gauge (AWG). Further, the size of each internal conductor 480 may be at least 29 AWG, such as at least 28 AWG, at least 27 AWG, or at least 26 AWG. In another aspect, the size of each internal conductor 480 may be less than or equal to 22 AWG, such as less than or equal to 23 AWG, less than or equal to 24 AWG, or less than or equal to 25 AWG. It is to be understood that the size of each internal conductor 480 may be within a range between, and including, any of the minimum and maximum size values described above.

Moreover, the size of each of the external conductors 482, 484 may be at least 22 AWG. Further, the size of each external conductor 482, 484 may be at least 21 AWG, such as at least 20 AWG, at least 19 AWG, or at least 18 AWG. In another aspect, the size of each external conductor 482, 484 may be less than or equal to 14 AWG, such as less than or equal to 15 AWG, less than or equal to 16 AWG, or less than or equal to 17 AWG. It is to be understood that the size of each external conductor 482, 484 may be within a range between, and including, any of the minimum and maximum size values described above.

In a particular aspect, the conductors 480, 482, 484 are stranded wire conductors comprising oxygen free copper that is heat treated to maximize ductility. Each wire strand of the conductors 480, 482, 484 may have a wire size that is at least 50 AWG. Moreover, the wire size of each wire strand may be at least 49 AWG, such as at least 48 AWG, at least 47 AWG, at least 46 AWG, at least 45 AWG, or at least 44 AWG. In another aspect, the size of each wire strand may be less than or equal to 38 AWG, such as at least 39 AWG, at least 40 AWG, at least 41 AWG, at least 42 AWG, or at least 43 AWG. It is to be understood that the size of each wire strand may be within a range between, and including, any of the minimum and maximum size values described above. Stated more generally, each of the internal conductors 480 has a smaller AWG (meaning a wire having a smaller diameter) than the external conductors 482, 484.

When the scale platform 204 is assembled, the scale platform cover 302 may fit over the scale platform load cell carrier 300. Specifically, the scale platform cover 302 may fit over the scale platform load cell carrier 300 so that the outer wall 384 of the scale platform cover 302 fits around the outer wall 314 of the scale platform load cell carrier 300. Moreover, the inner wall 386 of the scale platform cover 302 may fit inside the perimeter provided by the inner wall 316 of the scale platform load cell carrier 300. Each load cell post 390, 392, 394, 396 of the scale platform cover 302 may fit into a load mount 330, 332, 334, 336 on a respective load cell 320, 322, 324, 326.

The scale platform cable assembly 430 may extend between the scale platform cover 302 and the scale platform load cell carrier 300. Specifically, the first connector end 432 of the scale platform cable assembly 430 may be affixed to the scale platform load cell carrier 300 and the first data connector 448 on the first connector end 432 of the scale platform cable assembly 430 may extend in a generally downward direction through the lower data connector through hole 372 formed in the scale platform load cell carrier 300. Further, the first power connector 450 on the first connector end 432 of the scale platform cable assembly 430 may extend in a generally downward direction through the lower power connector through hole 370 formed in the scale platform load cell carrier 300. It can be appreciated that a data cable from a computer system may be connected to the first data connector 448 on the first connector end 432 of the scale platform cable assembly 430. A power cable from a power supply may be connected to the first power connector 450 on the first connector end 432 of the scale platform cable assembly 430.

Additionally, the second connector end 434 of the scale platform cable assembly 430 may be affixed to the scale platform cover 302 and the second data connector 468 on the second connector end 434 of the scale platform cable assembly 430 may extend in a generally upward direction through the upper data connector through hole 422 formed in the scale platform cover 302. Further, the second power connector 470 on the second connector end 434 of the scale platform cable assembly 430 may extend in a generally upward direction through the upper power connector through hole 420 formed in the scale platform cover 302. It can be appreciated that a data cable from one or more electrical devices within a warming therapy device may be connected to the second data connector 468 on the second connector end 434 of the scale platform cable assembly 430. A power cable from one or more electrical devices within a warming therapy device may be connected to the second power connector 470 on the second connector end 434 of the scale platform cable assembly 430.

Accordingly, when the scale platform 204 is assembled as described herein, external power cables and external data cables (not shown) may be connected to the connectors 448, 450, 468, 470 on the ends 432, 436 of the scale platform cable assembly 430 and the scale platform cable assembly 430 may transmit power and data signals through the scale platform cable assembly 430 and as such, through the scale platform 204. Connecting additional cables to a warming therapy device in which the scale platform 204 is installed may be eliminated. As such, any effect on a weight measurement of a bassinet of the warming therapy device at various tilt positions, caused by cables being hung therefrom may be eliminated, or otherwise substantially mitigated, by the scale platform cable assembly 430 which acts as a pass through transmission device for power and data. The scale platform cable assembly 430 may provide a constant weight, or downward force, on the scale platform cover 302 without providing any spring force or additional lateral forces on the scale platform cover 302.

Accordingly, during factory calibration, the load cells 320, 322, 324, 326 disposed on the scale platform load cell carrier 300 within the scale platform 204 may be adjusted to account for the constant load provided by the weight of the scale platform cable assembly 430. Once the load cells 320, 322, 324, 326 are adjusted and calibrated, the scale platform 204 may remain calibrated and may provide accurate weight measurements within the calibrated tolerances regardless of any angular position of the bassinet 208. Accordingly, the bassinet 208, may be tilted to any position without affecting the calibration of the scale platform 204 or any weight measurements provided by the scale platform 204.

Figure 10:
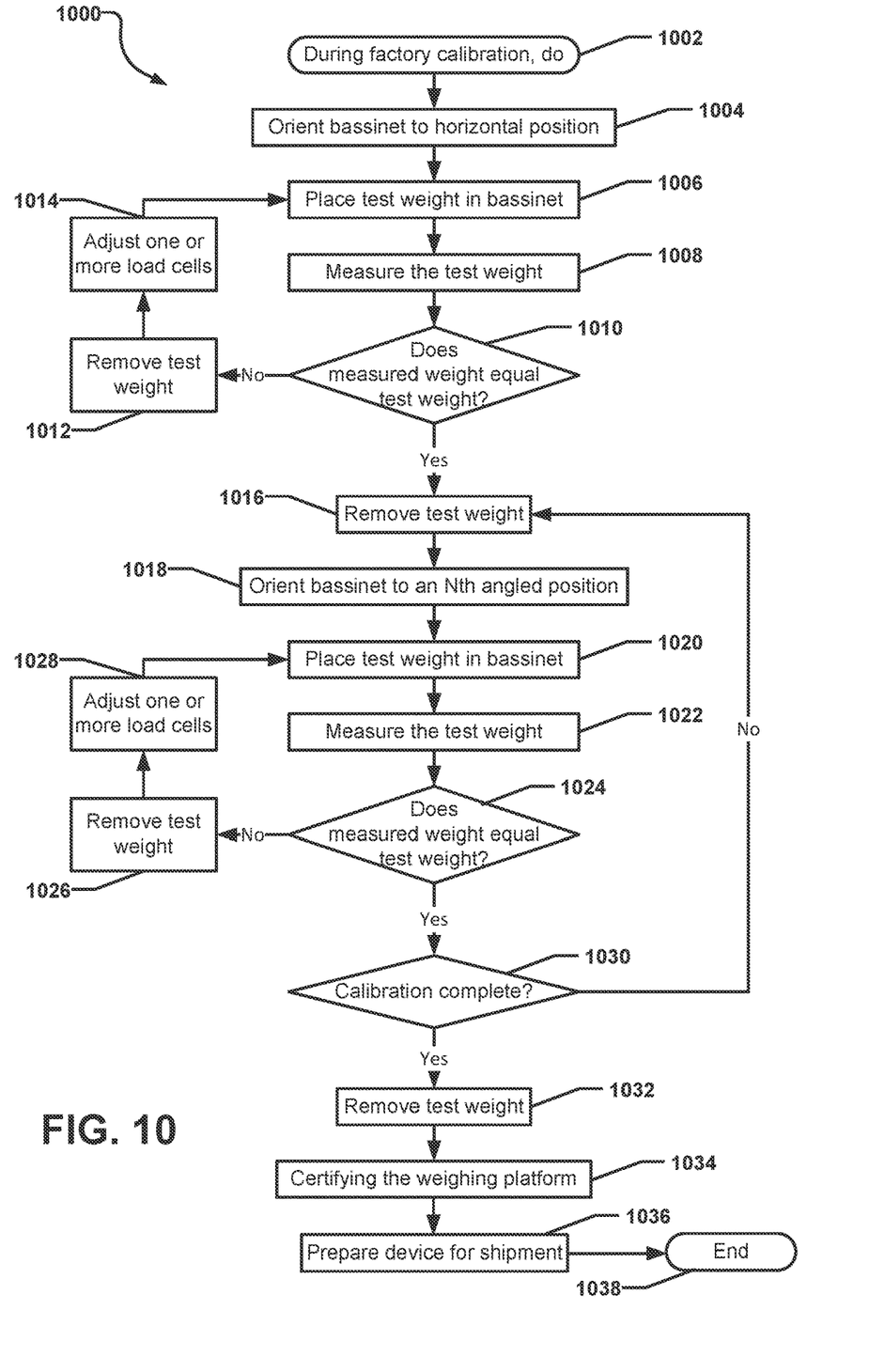
FIG. 10 is a flowchart illustrating a method of calibrating a scale platform of a warming therapy device according to an embodiment of the present disclosure.

Referring now to FIG. 10, a method of calibrating a scale platform of a warming therapy device is shown and is generally designated 1000. Commencing at step 1002, the method 1000 includes entering into a "do" loop wherein during factory calibration, the following steps may be performed. At step 1004, the bassinet may be oriented to a horizontal position. At step 1006, a test weight may be placed in the bassinet at the horizontal position. Thereafter, at 1008, the weight of the test weight may be measured at the horizontal position.

Moving to step 1010, it may be determined whether the measured weight of the test weight equals the actual weight of the test weight. At step 1010, if the measured weight does not equal the test weight, the method 1000 may move to step 1012 and the test weight may be removed from the bassinet. Then, at 1014, one or more load cells within the scale platform may be adjusted to account for the differences in the measured weight and the test weight. The method 1000 may return to step 1006 and continue as described herein.

Returning to step 1010, if the measured weight equals the test weight, the method 1000 may continue to step 1016 and the test weight may be removed from the bassinet. Thereafter, at step 1018, the bassinet may be oriented to an Nth angled position. The Nth angled position may be any angled position in which the bassinet is not level or horizontal. The Nth angled position may be a first angled position, a second angled position, a third angled position, a fourth angled position, a fifth angled position, etc. At step 1020, a test weight may be placed in the bassinet at the Nth position. At step 1022, the weight of the test weight may be measured at the Nth position.

Continuing to step 1024, it may be determined whether the measured weight of the test weight equals the actual weight of the test weight. At step 1024, if the measured weight of the test weight does not equal the actual weight of the test weight, the method 1000 may proceed to step 1026 and the test weight may be removed from the bassinet. Next, at step 1028, one or more load cells within the scale platform may be adjusted to account for the differences in the measured weight and the test weight. Thereafter, the method 1000 may return to step 1020 and continue as described herein.

Returning to step 1024, if the measured weight equals the test weight, the method may proceed to step 1030. At step 1030, it may be determined whether the calibration is complete. At step 1030, if the calibration is not complete, the method 1000 may return to step 1016 and continue as described herein for additional Nth angular positions.

At step 1030, if the calibration is complete, the method 1000 may proceed to step 1032 and the test weight may be removed from the bassinet. Then, at step 1034, the weight platform may be certified that the scale platform is calibrated for weighing an infant at any angled position of the bassinet. Thereafter, at step 1036, the device may be prepared for shipment. Then, at step 1038, the method 1000 may end.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

We claim:

1. An apparatus comprising:
   a computer system comprising a processor or a controller, a user interface, and a memory;
   a base;
   a scale platform disposed on the base, the scale platform comprising:
      a scale platform load cell carrier;
      a scale platform cover; and
      a plurality of load cells positioned between the scale platform load cell carrier and the scale platform cover;
   a warming therapy device comprising a bassinet and at least one electrical device, the at least one electrical device selected from the group of: at least one physiological sensor, a temperature sensor, a heater, a tilt position sensor, and a tilt mechanism, the warming therapy device being disposed on the scale platform, the scale platform disposed between the warming therapy device and the base; and
   a conductor assembly adapted to:
      supply electrical power between a power supply and at least some of the at least one electrical device, and
      enable the transmission of electrical signals from the at least one electrical device to the computer system, the conductor assembly comprising a scale platform cable assembly comprising a plurality of conductors, the scale platform cable assembly having a first connector end and a second connector end, the first connector end being rigidly affixed to the load cell carrier and the second connector end being rigidly affixed to the scale platform cover.

2. The apparatus of claim 1, wherein the scale platform cable assembly further comprises a flexible ribbon cable connected to the first connector end and to the second connector end.

3. The apparatus of claim 2, wherein the first connector end comprises:
   a first printed circuit board (PCB) connected to the flexible ribbon cable; and
   at least one data connector extending from the first PCB, wherein the at least one data connector is connected to the computer system.

4. The apparatus of claim 3, wherein the first connector end further comprises:
   at least one power connector extending from the PCB adjacent to the at least one data connector, wherein the at least one power connector is connected to a power supply.

5. The apparatus of claim 4, wherein the second connector end comprises:
   a second PCB connected to the flexible ribbon cable, the second PCB opposing the first PCB; and
   at least one data connector extending from the second PCB, wherein the at least one data connector is connected to at least one electrical device within the warming therapy device.

6. The apparatus of claim 5, wherein the second connector end further comprises at least one power connector extending from the second PCB adjacent to the at least one data connector, wherein the at least one power connector is connected to at least some of the at least one electrical device within the warming therapy device.

7. An apparatus comprising:
   a computer system comprising a processor or a controller, a user interface, and a memory;
   a base; and
   a scale platform disposed on the base, the scale platform comprising:
      a scale platform load cell carrier;
      a scale platform cover;
      a plurality of load cells positioned between the scale platform load cell carrier and the scale platform cover; and
      a scale platform cable assembly extending between the scale platform load cell carrier and the scale platform cover, the scale platform cable assembly comprising:
         a first connector end rigidly affixed to the scale platform load cell carrier;
         a second connector end rigidly affixed to the scale platform cover; and
         a flexible ribbon cable extending between the first connector end and the second connector end.

8. The apparatus of claim 7, wherein the flexible ribbon cable comprises a plurality of internal conductors aligned between a first external conductor and a second external conductor.

9. The apparatus of claim 8, wherein each of the plurality of internal conductors has a first AWG and each of the plurality of the external conductors has a second AWG, the first AWG being smaller than the second AWG.

10. The apparatus of claim 8, wherein at each lateral position along a length of the flexible ribbon cable the plurality of internal conductors and the plurality of external conductors are aligned along a transverse linear axis that is perpendicular to a central axis.

11. The apparatus of claim 7, wherein the flexible ribbon cable comprises a flexible insulating jacket that completely encapsulates the internal conductors, the first external conductor, and the second external conductor along a length of the flexible ribbon cable such that each of the internal conductors, the first external conductor, and the second external conductor is separated apart from one another.

12. The apparatus of claim 11, wherein the flexible insulating jacket comprises a flexible polymer material.

13. The apparatus of claim 8, wherein the flexible ribbon cable is symmetric about a central axis extending lengthwise along the flexible ribbon cable.

14. The apparatus of claim 7, wherein the scale platform cable assembly is adapted to:
   supply electrical power between a power supply and at least one electrical device within a warming therapy device; and
   enable transmission of electrical signals from the at least one electrical device to the computer system.

15. The apparatus of claim 7, wherein the scale platform load cell carrier includes at least one lower connector through hole formed therein.

16. The apparatus of claim 15, wherein the first connector end of the scale platform cable assembly includes at least one connector extending through the at least one lower connector through hole.

17. The apparatus of claim 16, wherein the at least one connector extending through the at least one lower connector through hole connects to a cable from the computer system, a power supply, or a combination thereof.

18. The apparatus of claim 17, wherein the scale platform cover includes at least one upper connector through hole formed therein.

19. The apparatus of claim 18, wherein the second connector end of the scale platform cable assembly includes a least one connector extending through the at least one upper connector through hole.

20. The apparatus of claim 19, wherein the at least one connector extending through the at least one upper connector through hole connects a cable from the least one electrical device within the warming therapy device.

21. A scale platform for a warming therapy device, comprising:
- a scale platform load cell carrier;
- a scale platform cover that fits over the scale platform load cell carrier; and
- a scale platform cable assembly extending between the scale platform load cell carrier and the scale platform cover,
- wherein the scale platform cable assembly provides a downward force on the scale platform cover that is constant regardless of the position of the scale platform cover with respect to the scale platform load cell carrier.

22. The scale platform of claim 21, wherein when a bassinet is placed on the scale platform, the downward force on the scale platform is constant regardless of a tilt angle of the bassinet with respect to the scale platform.

23. A method of calibrating a scale platform of a warming therapy device, the method comprising:
- orienting a bassinet of the warming therapy device to a plurality of angled tilt positions;
- placing a test weight in the bassinet at each of the multiple angled tilt positions;
- measuring the test weight at each of the multiple angled tilt positions; and
- determining whether a measured weight equals the test weight at each of the plurality of angled tilt positions.

24. The method of claim 23, further comprising:
- when the measured weight differs from the test weight at the at least one of the plurality of angled tilt positions, removing the test weight at the at least one of the plurality of angled tilt positions; and
- adjusting one or more load cells within the scale platform.

25. The method of claim 24, further comprising:
- placing the test weight in the bassinet at a particular angled position;
- measuring the test weight at the particular angled position; and
- determining whether a measured weight equals the test weight at the particular angled position.

26. The method of claim 25, further comprising:
- when the measured weight equals the test weight at each of the plurality of angled tilt positions, removing the test weight; and
- certifying that the scale platform is calibrated for weighing an infant within the bassinet of the warming therapy device for all angled tilt positions of the bassinet.

* * * * *